June 16, 1964 M. SALO ETAL 3,137,585
NON-FLAMMABLE GELABLE COMPOSITION OF CELLULOSE ACETATE
PROPIONATE AND CELLULOSE ACETATE BUTYRATE
Filed March 14, 1963
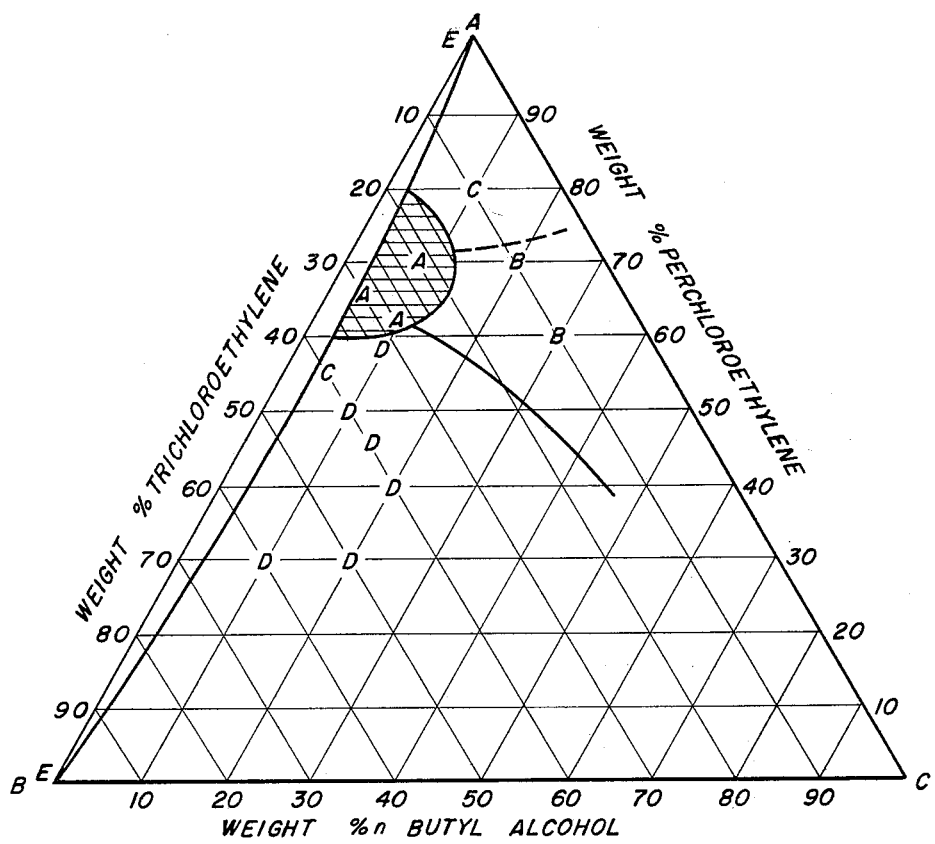
MARTIN SALO
GERARD J. CLARKE
INVENTORS
BY
ATTORNEYS

United States Patent Office 3,137,585
Patented June 16, 1964

3,137,585
NON-FLAMMABLE GELABLE COMPOSITION OF CELLULOSE ACETATE PROPIONATE AND CELLULOSE ACETATE BUTYRATE
Martin Salo and Gerard J. Clarke, Rochester, N.Y., assignors to Eastman Kodak Company, Rochester, N.Y., a corporation of New Jersey
Filed Mar. 14, 1963, Ser. No. 265,149
9 Claims. (Cl. 106—189)

This invention relates to a solvent system for gelable compositions based on cellulose acetate propionate or cellulose acetate butyrate, and to the gelable compositions per se.

This application is a continuation-in-part of Salo et al. U.S. patent application Serial No. 158,795, filed December 12, 1961, now abandoned.

It is frequently useful to coat various articles, for example, tools, glassware or electronic equipment, with a relatively thick (above .020-inch) clear, tough film of plastic such as cellulose acetate propionate or cellulose acetate butyrate. A convenient method of applying such coatings is to dip the article in a gelable composition comprising the plastic and a solvent. Heretofore, gelable compositions have been formulated which produce one-dip coatings of cellulose acetate propionate, or cellulose acetate butyrate of adequate thickness when the gelable composition is heated to about 120–140° F. (which is about its flash point). At such temperatures the solvents suggested have been flammable, creating the dangers of fire or explosion. Hence, it appeared desirable to provide a solvent system for cellulose acetate propionate and cellulose acetate butyrate coating compositions which would have a higher flash point than the coating temperatures, and to formulate gelable compositions based on cellulose acetate propionate or cellulose acetate butyrate in non-flammable and non-explosive solvent mixtures.

Accordingly, one object of our invention is to provide gelable compositions with cellulose acetate propionate or cellulose acetate butyrate in a non-flammable and non-explosive solvent system. Another object of our invention is to provide a high flash point solvent system for cellulose acetate propionate and cellulose acetate butyrate. Other objects of our invention will appear herein.

These and other objects of our invention are accomplished by a solvent system comprising about 60–80% perchloroethylene, 17–37% trichloroethylene, and 2–15% n-butyl alcohol. We have found that this solvent system may be employed in the formulation of gelable compositions with cellulose acetate propionate or cellulose acetate butyrate to produce a non-flammable and non-explosive composition. Articles may be coated with a film of substantial thickness (over about .020-inch) by dipping the article once in gelable compositions formulated in accordance with our invention at a temperature of about 120–140° F. Since the flash point of our solvent system is above 160° F., there is no fire or explosion hazard at the coating temperature.

The accompanying drawing comprises a triangular graph showing solvent systems containing varying proportions (by weight percent) of trichloroethylene, perchloroethylene and n-butyl alcohol. Shaded Area "A" indicates the generally useful proportions of components. The area designated "B," while furnishing good coatings, has a flash point below 140° F. Area "C" produces too viscous a composition for dip coating lacquers, and Area "E" produces insoluble compositions with cellulose acetate propionate and cellulose acetate butyrate at both room temperature and at coating temperatures. Solvent systems in Area "D" produce soluble compositions at room temperature.

Our invention will be further illustrated by the following examples. Examples 1, 2 and 3 show the gel lacquer properties of a lacquer grade cellulose acetate propionate, having an acetyl range of 1.5% to 3.5%, a propionyl range of 43% to 47%, and an intrinsic viscosity in acetone of 1.8, when employed at various solids concentrations with the solvent system of our invention. The results of these examples are set out in Table I.

TABLE I

| Composition, Solvent System, Weight Percent | | Cellulose Acetate Propionate, Solids Concentration, Percent | Viscosity, Cps. | | | Gel. Temp., °F. | Flash Point |
|---|---|---|---|---|---|---|---|
| | | | at 125° F. | at 130° F. | at 140° F. | | |
| Example 1 | 70% perchloroethylene; 20% trichloroethylene; 10% n-butyl alcohol. | 10 | 2,000 | 1,600 | 1,250 | 88 | No flash below 160° F. |
| | ----do---- | 15 | 29,000 | 18,000 | 11,900 | 106 | Do. |
| | ----do---- | 20 | 319,000 | 240,000 | 87,200 | 113 | Do. |
| Example 2 | 65% perchloroethylene; 25% trichloroethylene; 10% n-butyl alcohol. | 10 | 1,700 | 1,350 | 1,100 | 80 | Do. |
| | ----do---- | 15 | 22,600 | 14,500 | 10,700 | 96 | Do. |
| | ----do---- | 20 | 227,500 | 160,000 | 78,000 | 113 | Do. |
| Example 3 | 62% perchloroethylene; 28% trichloroethylene; 10% n-butyl alcohol. | 10 | 1,750 | 1,300 | 1,000 | 69 | Do. |
| | ----do---- | 15 | 16,250 | 1,900 | 8,900 | 92 | Do. |
| | ----do---- | 20 | 152,500 | 110,000 | 75,000 | 108 | Do. |

Examples 4 and 5 will illustrate a method of dip coating objects using the gel lacquer coating system of our invention.

*Example 4*

A gelable composition was formulated by stirring cellulose acetate propionate (1.5–3.5% acetyl; 43–47% propionyl; intrinsic viscosity in acetone of 1.8) into a solvent system consisting of, by weight percent, 70% perchloroethylene, 20% trichloroethylene and 10% n-butanol while holding the temperature at about 120° F. The amount of cellulose acetate propionate in the solvent system was regulated to provide a 20% solids concentration. A glass tube, at room temperature, was immersed slowly (to avoid agitation) into the coating composition, which was maintained at about 120° F. The tube was then withdrawn slowly and, just after withdrawal, was inverted so that the tail fell back and smoothed out in the coated tube. The coated tube was held at room temperature until the solvents evaporated. A clear, tough coating about .020-inch thick was formed on the tube.

*Example 5*

The coating composition prepared in Example 4 was employed to coat a block of wood. The same procedure was employed as that in coating the glass tube in Example 4. Upon curing, the block of wood was found to have a clear, tough coating about .020-inch thick.

Example 6

A gel lacquer coating composition was prepared in accordance with our invention, and an attempt was made to burn the dope by applying the flame of a Bunsen burner thereto. The dope did burn. A layer .020-inch thick of the gel lacquer was knife coated at 120°–140° F. onto a steel plate, and attempts were made to burn the film at frequent intervals during the cure thereof by bringing the flame of the Bunsen burner in close proximity thereto. The film cured to dryness without flaming. While the film burned when the flame was applied directly, the film ceased to burn when the flame was removed.

Example 7

A gelable composition was formed by stirring cellulose acetate butyrate (containing about 13% acetyl and 37% butyryl, and having an intrinsic viscosity in acetone of about .7) into a solvent system consisting of, by weight percent, 65% perchloroethylene, 25% trichloroethylene and 10% n-butanol while holding the temperature at about 120° F. The amount of cellulose acetate butyrate was regulated to provide a 25% solids concentration. The gelable composition had a viscosity of 3000 cps. at 125° F. and a flash point above 160° F. A glass tube was coated with the composition in the manner described in Example 4. A clear, tough coating about .020-inch thick was formed on the tube.

The cellulose acetate propionate which may be utilized to formulate gelable compositions with the solvent system of our invention may have 35–50% propionyl and 12–1% acetyl. We prefer to employ cellulose acetate propionate having 1.5 to 3.5% acetyl and 43–47% propionyl. Gelable compositions may be formulated in accordance with our invention with cellulose acetate butyrate having 30–50% butyryl and 2–25% acetyl. Cellulose acetate butyrate having 12–14% acetyl and 36–40% butyryl produces highly satisfactory results.

In preparing the gel dip lacquer composition based on cellulose acetate propionate, the optimum percent solids in the solvent system depends on the viscosity of the cellulose acetate propionate. For example, we prefer to employ about 15% solids when using a "20 second" (determined by A.S.T.M. Method D–1343–54T in the solution described as Formula A, A.S.T.M. Method D–871–54T) cellulose acetate propionate having an acetyl content of 1.5% to 3.5%, a propionyl content of 43–47%, and an intrinsic viscosity in acetone of 1.8. When a low viscosity cellulose acetate propionate is employed, the lacquer composition could be adjusted to contain a higher solids content. With gelable compositions based on cellulose acetate butyrate, we prefer to employ about 25% solids when using a "half second butyrate" having 12–13% acetyl, 36–40% butyryl and a viscosity in acetone of about .7. When a cellulose acetate butyrate having higher or lower viscosity is employed, the lacquer composition is advantageously adjusted to contain, respectively, a lower or a higher solids content.

Various other addenda such as dyes, pigments, and plasticizers may be incorporated in the lacquer compositions of our invention.

Dip coating of articles with coating compositions formulated in accordance with our invention may be accomplished with or without heating the article to be coated. The "tail" of gel lacquers which forms when an article is withdrawn from the coating composition may be caused to smooth out and provide a neat coating by inverting the article immediately after withdrawing it from the coating composition.

Curing of films coated from compositions in accordance with our invention may be accomplished in a variety of ways. However, the temperature should be kept sufficiently low after coating to avoid causing the film to become fluid. After a major portion of the solvent has been evaporated from the film, the temperature may be elevated to facilitate curing.

The gelable compositions of our invention are especially useful in coating television picture tubes as described in Crowley et al. U.S. patent application Serial No. 258,642, filed February 14, 1963.

The invention has been described in considerable detail with particular reference to certain preferred embodiments thereof, but it will be understood that variations and modifications can be effected within the spirit and scope of the invention as described hereinabove, and as defined in the appended claims.

We claim:

1. A gelable composition comprising a cellulose ester selected from the group consisting of cellulose acetate propionate and cellulose acetate butyrate, and a solvent system comprising, by weight, 60–80% perchloroethylene, 17–37% trichloroethylene and 2–15% n-butyl alcohol.

2. A composition of matter comprising 10–20% solids solution of cellulose acetate propionate having 1.5–3.5% acetyl and 43–47% propionyl in a solvent system essentially consisting of, by weight, 60–80% perchloroethylene, 17–37% trichloroethylene and 2–15% n-butyl alcohol.

3. Claim 2 wherein the solvent system essentially consists of 70% perchloroethylene, 20% trichloroethylene and 10% n-butyl alcohol.

4. Claim 2 wherein the solvent system essentially consists of 65% perchloroethylene, 25% trichloroethylene and 10% n-butyl alcohol.

5. Claim 2 wherein the solvent system essentially consists of 62% perchloroethylene, 28% trichloroethylene and 10% n-butyl alcohol.

6. A gelable composition comprising cellulose acetate propionate and a solvent system comprising, by weight, 60–80% perchloroethylene, 17–37% trichloroethylene and 2–15% n-butyl alcohol.

7. A gelable composition comprising cellulose acetate butyrate and a solvent system comprising, by weight, 60–80% perchloroethylene, 17–37% trichloroethylene and 2–15% n-butyl alcohol.

8. A composition of matter comprising cellulose acetate butyrate having 12–14% acetyl and 36–40% butyryl in a solvent system essentially consisting of, by weight, 60–80% perchloroethylene, 17–37% trichloroethylene and 2–15% n-butyl alcohol.

9. Claim 8 wherein the solvent system essentially consists of 65% perchloroethylene, 25% trichloroethylene and 10% n-butyl alcohol.

References Cited in the file of this patent

UNITED STATES PATENTS

| | | |
|---|---|---|
| 1,079,773 | Koller | Nov. 25, 1913 |
| 2,319,054 | Fordyce et al. | May 11, 1943 |
| 2,350,744 | Fordyce et al. | June 6, 1944 |
| 2,367,503 | Hunter et al. | Jan. 16, 1945 |
| 2,371,644 | Petering et al. | Mar. 20, 1945 |